(12) United States Patent
Benedict et al.

(10) Patent No.: US 11,998,871 B2
(45) Date of Patent: *Jun. 4, 2024

(54) ELECTRODIALYTIC LIQUID DESICCANT DEHUMIDIFYING SYSTEM

(71) Applicant: Mojave Energy Systems, Inc., Palo Alto, CA (US)

(72) Inventors: Michael Benedict, Palo Alto, CA (US); Eugene S. Beh, Portola Valley, CA (US); Elif Karatay, Mountain View, CA (US)

(73) Assignee: Mojave Energy Systems, Inc., Sunnyvale, CA (US)

( * ) Notice: Subject to any disclaimer, the term of this patent is extended or adjusted under 35 U.S.C. 154(b) by 390 days.

This patent is subject to a terminal disclaimer.

(21) Appl. No.: 17/400,774

(22) Filed: Aug. 12, 2021

(65) Prior Publication Data

US 2021/0370228 A1    Dec. 2, 2021

Related U.S. Application Data

(63) Continuation of application No. 16/200,376, filed on Nov. 26, 2018, now Pat. No. 11,117,090.

(51) Int. Cl.
*B01D 53/14*    (2006.01)
*B01D 53/18*    (2006.01)
(Continued)

(52) U.S. Cl.
CPC ..... *B01D 53/1425* (2013.01); *B01D 53/1412* (2013.01); *B01D 53/18* (2013.01);
(Continued)

(58) Field of Classification Search
None
See application file for complete search history.

(56) References Cited

U.S. PATENT DOCUMENTS

| 2,147,248 A | 2/1939 | Fleisher |
| 2,214,880 A | 9/1940 | Crawford |

(Continued)

FOREIGN PATENT DOCUMENTS

| CN | 105308317 A | 2/2016 |
| CN | 206055832   | 3/2017 |

(Continued)

OTHER PUBLICATIONS

Guo, Y. (2016). Using electrodialysis for regeneration of aqueous lithium chloride solution in liquid desiccant air conditioning systems. Energy and Buildings, 116, 285-295. (Year: 2016).*

(Continued)

*Primary Examiner* — Gabriel E Gitman

(57) ABSTRACT

Air flows across an air-liquid interface such that liquid desiccant flowing through the interface absorbs water from the air and is thereby diluted to form an output stream. The output stream is circulated through an electrodialytic stack having a central ionic exchange membrane and first and second outer ionic exchange membranes. A redox shuttle loop circulates around the first and second outer ionic exchange membranes. A voltage is applied across the electrodialytic stack, which regenerates the liquid desiccant.

17 Claims, 10 Drawing Sheets

(51) Int. Cl.
  *B01D 53/26* (2006.01)
  *B01D 61/42* (2006.01)
  *F24F 3/14* (2006.01)
  *H01M 8/18* (2006.01)
  *H01M 8/22* (2006.01)

(52) U.S. Cl.
  CPC ......... *B01D 53/263* (2013.01); *B01D 61/422* (2013.01); *F24F 3/1417* (2013.01); *H01M 8/188* (2013.01); *H01M 8/227* (2013.01); B01D 53/268 (2013.01); B01D 2311/25 (2013.01); F24F 3/1411 (2013.01); F24F 2003/144 (2013.01)

(56) References Cited

U.S. PATENT DOCUMENTS

| | | |
|---|---|---|
| 2,276,970 A | 3/1942 | Hyde |
| 2,290,465 A | 7/1942 | Crawford |
| 2,672,024 A | 3/1954 | McGrath |
| 2,798,570 A | 7/1957 | Kelley |
| 3,277,954 A | 10/1966 | Gershon |
| 3,336,423 A | 8/1967 | Le Clair et al. |
| 3,350,892 A | 11/1967 | Kelley |
| 3,729,142 A | 4/1973 | Rangel et al. |
| 3,819,118 A | 6/1974 | Brock et al. |
| 3,981,452 A | 9/1976 | Eckstein |
| 3,993,248 A | 11/1976 | Harmony |
| 4,118,299 A | 10/1978 | Maget |
| 4,164,125 A | 8/1979 | Griffiths |
| 4,205,529 A | 6/1980 | Ko |
| 4,259,849 A | 4/1981 | Griffiths |
| 4,287,721 A | 9/1981 | Robison |
| 4,340,479 A | 7/1982 | Pall |
| 4,340,480 A | 7/1982 | Pall et al. |
| 4,355,683 A | 10/1982 | Griffiths |
| 4,593,534 A | 6/1986 | Bloomfield |
| 4,612,019 A | 9/1986 | Langhorst |
| 4,691,530 A | 9/1987 | Meckler |
| 4,700,550 A | 10/1987 | Rhodes |
| 4,900,448 A | 2/1990 | Bonne et al. |
| 4,984,434 A | 1/1991 | Peterson et al. |
| 5,022,241 A | 6/1991 | Wilkinson |
| 5,351,497 A | 10/1994 | Lowenstein |
| 5,460,004 A | 10/1995 | Tsimerman |
| 5,528,905 A | 6/1996 | Scarlatti |
| 5,586,727 A | 12/1996 | Shekalim |
| 5,615,838 A | 4/1997 | Eckstein et al. |
| 5,634,269 A | 6/1997 | Lowenstein et al. |
| 5,797,272 A | 8/1998 | James |
| 5,928,409 A | 7/1999 | Sirkar |
| 5,966,955 A | 10/1999 | Maeda |
| 6,018,954 A | 2/2000 | Assaf |
| 6,080,507 A | 6/2000 | Yu |
| 6,149,817 A | 11/2000 | Peterson et al. |
| 6,159,352 A | 12/2000 | Riera et al. |
| 6,187,201 B1 | 2/2001 | Abe et al. |
| 6,463,750 B2 | 10/2002 | Assaf |
| 6,487,872 B1 | 12/2002 | Forkosh et al. |
| 6,497,107 B2 | 12/2002 | Maisotsenko et al. |
| 6,497,749 B2 | 12/2002 | Kesten et al. |
| 6,719,891 B2 | 4/2004 | Ruhr et al. |
| 6,745,826 B2 | 6/2004 | Lowenstein et al. |
| 6,976,365 B2 | 12/2005 | Forkosh et al. |
| 6,986,428 B2 | 1/2006 | Hester et al. |
| 7,083,730 B2 | 8/2006 | Davis |
| 7,279,215 B2 | 10/2007 | Hester et al. |
| 7,430,878 B2 | 10/2008 | Assaf |
| 7,942,011 B2 | 5/2011 | Forkosh |
| 7,942,387 B2 | 5/2011 | Forkosh |
| 7,974,076 B2 | 7/2011 | Xiong et al. |
| 7,977,395 B2 | 7/2011 | Lin et al. |
| 7,992,855 B2 | 8/2011 | Awano |
| 8,142,633 B2 | 3/2012 | Batchelder et al. |
| 8,171,746 B2 | 5/2012 | Miyauchi et al. |
| 8,545,692 B2 | 10/2013 | James et al. |
| 8,623,210 B2 | 1/2014 | Manabe et al. |
| 8,685,142 B2 | 4/2014 | Claridge et al. |
| 8,696,805 B2 | 4/2014 | Chang et al. |
| 8,769,971 B2 | 7/2014 | Kozubal et al. |
| 8,769,972 B2 | 7/2014 | Bahar |
| 8,790,454 B2 | 7/2014 | Lee et al. |
| 8,800,308 B2 | 8/2014 | Vandermeulen et al. |
| 8,801,910 B2 | 8/2014 | Bazant et al. |
| 8,999,132 B2 | 4/2015 | Bazant et al. |
| 9,000,289 B2 | 4/2015 | Vandermeulen et al. |
| 9,086,223 B2 | 7/2015 | Vandermeulen et al. |
| 9,101,874 B2 | 8/2015 | Vandermeulen |
| 9,101,875 B2 | 8/2015 | Vandermeulen et al. |
| 9,112,217 B2 | 8/2015 | Kim et al. |
| 9,140,471 B2 | 9/2015 | Kozubal et al. |
| 9,243,810 B2 | 1/2016 | Vandermeulen et al. |
| 9,273,876 B2 | 3/2016 | Smith et al. |
| 9,308,490 B2 | 4/2016 | Vandermeulen et al. |
| 9,340,436 B2 | 5/2016 | Sahu et al. |
| 9,506,697 B2 | 11/2016 | Vandermeulen |
| 9,541,302 B2 | 1/2017 | Taylor et al. |
| 9,546,426 B2 | 1/2017 | Logan et al. |
| 9,548,620 B2 | 1/2017 | Hu et al. |
| 9,631,848 B2 | 4/2017 | Vandermeulen et al. |
| 9,640,826 B2 | 5/2017 | Yan et al. |
| 9,670,077 B2 | 6/2017 | Volkel et al. |
| 9,673,472 B2 | 6/2017 | Volkel et al. |
| 9,709,285 B2 | 7/2017 | Vandermeulen |
| 9,835,340 B2 | 12/2017 | Vandermeulen et al. |
| 9,905,876 B2 | 2/2018 | Schubert et al. |
| 9,982,901 B2 | 5/2018 | Mongar |
| 10,012,401 B2 | 7/2018 | Forkosh |
| 10,024,558 B2 | 7/2018 | Vandermeulen |
| 10,124,296 B2 | 11/2018 | Pozzo et al. |
| 10,302,317 B2 | 5/2019 | Erb et al. |
| 10,443,868 B2 | 10/2019 | Vandermeulen et al. |
| 10,525,417 B2 | 1/2020 | Newbloom et al. |
| 10,550,014 B2 | 2/2020 | Desai et al. |
| 10,604,426 B2 | 3/2020 | Connor, Jr. et al. |
| 10,648,743 B2 | 5/2020 | Kozubal et al. |
| 10,712,024 B2 | 7/2020 | LePoudre et al. |
| 10,721,024 B2 | 7/2020 | Seo |
| 10,821,395 B2 | 11/2020 | Beh |
| 10,822,254 B2 | 11/2020 | Desai et al. |
| 10,962,252 B2 | 3/2021 | LePoudre et al. |
| 11,015,875 B2 | 5/2021 | Benedict et al. |
| 11,020,713 B2 | 6/2021 | Demeter et al. |
| 11,029,045 B2 | 6/2021 | Woods et al. |
| 11,117,090 B2 | 9/2021 | Benedict et al. |
| 11,149,970 B2 | 10/2021 | Bahar et al. |
| 11,185,823 B2 | 11/2021 | Beh et al. |
| 11,326,790 B2 | 5/2022 | Woods et al. |
| 11,532,831 B1 | 12/2022 | Beh |
| 11,760,631 B2 | 9/2023 | Chandran et al. |
| 2002/0038552 A1 | 4/2002 | Maisotsenko et al. |
| 2004/0118125 A1 | 6/2004 | Potnis et al. |
| 2004/0168462 A1 | 9/2004 | Assaf |
| 2004/0231512 A1 | 11/2004 | Slayzak et al. |
| 2005/0183956 A1 | 8/2005 | Katefidis |
| 2006/0130654 A1 | 6/2006 | King et al. |
| 2006/0141346 A1 | 6/2006 | Gordon et al. |
| 2009/0114594 A1 | 5/2009 | Sirkar |
| 2009/0178436 A1 | 7/2009 | Chiriac |
| 2010/0170776 A1 | 7/2010 | Ehrenberg et al. |
| 2010/0275629 A1 | 11/2010 | Erickson |
| 2011/0132027 A1 | 6/2011 | Gommed et al. |
| 2012/0304862 A1 | 12/2012 | Taylor et al. |
| 2013/0199220 A1 | 8/2013 | Ma et al. |
| 2013/0319021 A1 | 12/2013 | Ball et al. |
| 2013/0340449 A1 | 12/2013 | Kozubal et al. |
| 2014/0054013 A1 | 2/2014 | LePoudre et al. |
| 2014/0260367 A1 | 9/2014 | Coutu et al. |
| 2014/0262125 A1 | 9/2014 | Erb et al. |
| 2014/0326433 A1 | 11/2014 | Kozubal |
| 2014/0349279 A1 | 11/2014 | Berthelot et al. |
| 2015/0048777 A1 | 2/2015 | Goldstein |
| 2015/0059576 A1 | 3/2015 | Shibata |
| 2015/0101625 A1 | 4/2015 | Newton et al. |

(56) References Cited

U.S. PATENT DOCUMENTS

| | | |
|---|---|---|
| 2015/0232348 A1 | 8/2015 | Jepson |
| 2015/0260420 A1 | 9/2015 | Forkosh |
| 2015/0291452 A1 | 10/2015 | Jikihara et al. |
| 2015/0292754 A1 | 10/2015 | Mongar |
| 2015/0300754 A1 | 10/2015 | Vandermeulen et al. |
| 2015/0327596 A1 | 11/2015 | Alarcon et al. |
| 2016/0138817 A1 | 5/2016 | Hamlin et al. |
| 2017/0145803 A1 | 5/2017 | Yeh et al. |
| 2017/0292722 A1 | 10/2017 | Vandermeulen |
| 2018/0187906 A1 | 7/2018 | Bahar et al. |
| 2018/0191012 A1 | 7/2018 | Zhang |
| 2018/0328602 A1 | 11/2018 | Vandermeulen |
| 2019/0145639 A1 | 5/2019 | Allen et al. |
| 2019/0240614 A1 | 8/2019 | Beh et al. |
| 2019/0240623 A1 | 8/2019 | Beh et al. |
| 2019/0285290 A1 | 9/2019 | Woods et al. |
| 2019/0331353 A1 | 10/2019 | Edström et al. |
| 2020/0039314 A1 | 2/2020 | Minakuchi et al. |
| 2020/0063995 A1 | 2/2020 | LePoudre |
| 2020/0070094 A1 | 3/2020 | Hussaini et al. |
| 2020/0096212 A1* | 3/2020 | LePoudre ............... F24F 3/147 |
| 2020/0164302 A1 | 5/2020 | Benedict et al. |
| 2020/0164312 A1 | 5/2020 | Beh et al. |
| 2020/0173671 A1 | 6/2020 | Rowe et al. |
| 2020/0182493 A1 | 6/2020 | Luttik |
| 2020/0278126 A1 | 9/2020 | Ide et al. |
| 2020/0326106 A1 | 10/2020 | Muthusubramanian |
| 2020/0333086 A1 | 10/2020 | Benedict et al. |
| 2020/0346164 A1 | 11/2020 | Verplancke |
| 2020/0384421 A1 | 12/2020 | Newbloom et al. |
| 2020/0388871 A1 | 12/2020 | Newbloom et al. |
| 2020/0393145 A1 | 12/2020 | Woods et al. |
| 2021/0254844 A1 | 8/2021 | Qasem et al. |
| 2021/0283528 A1 | 9/2021 | Pokornýet al. |
| 2021/0354089 A1 | 11/2021 | Wu et al. |
| 2022/0193612 A1 | 6/2022 | Torres et al. |
| 2022/0223885 A1 | 7/2022 | Beh et al. |
| 2022/0243932 A1 | 8/2022 | Benedict et al. |
| 2022/0299223 A1 | 9/2022 | Benedict et al. |
| 2022/0410070 A1 | 12/2022 | Beh |
| 2023/0141446 A1 | 5/2023 | Beh et al. |
| 2023/0173433 A1 | 6/2023 | Benedict et al. |
| 2023/0191312 A1 | 6/2023 | Benedict et al. |
| 2023/0264140 A1 | 8/2023 | Beh et al. |
| 2023/0280049 A1 | 9/2023 | Farese et al. |
| 2023/0294038 A1 | 9/2023 | Wallace |
| 2023/0332780 A1 | 10/2023 | Meles et al. |

FOREIGN PATENT DOCUMENTS

| | | |
|---|---|---|
| CN | 108187459 | 6/2018 |
| CN | 207455783 U | 6/2018 |
| CN | 111964168 A | 11/2020 |
| EP | 3336064 | 6/2018 |
| JP | 04-18919 | 4/1992 |
| KR | 20130106530 | 9/2013 |
| KR | 20150034545 | 4/2015 |
| WO | WO-9528609 A1 | 10/1995 |
| WO | WO-2011062808 A1 | 5/2011 |
| WO | WO-2012170887 A2 | 12/2012 |
| WO | 2014/181898 | 11/2014 |
| WO | 20150143332 | 9/2015 |
| WO | 2018/032003 | 2/2018 |
| WO | 2018/119280 | 6/2018 |
| WO | 20180191806 | 10/2018 |
| WO | WO-2020112592 A1 | 6/2020 |
| WO | WO-2020112712 A1 | 6/2020 |
| WO | WO-2023201184 A1 | 10/2023 |

OTHER PUBLICATIONS

"Lazard's Levelized Cost of Storage—Version 2.0." 2016, 46 pages.

Al-Jubainawi et al., "Factors governing mass transfer during membrane electrodialysis regeneration of LiCl solution for liquid desiccant dehumidification systems", Sustainable Cities and Society, vol. 28, Aug. 26, 2016.

Al-Karaghouli et al., "Energy consumption and water production cost of conventional and renewable-energy-powered desalination processes", Renewable and Sustainable Energy Reviews 2013, 24, 343-356.

Anderson et al., Capacitive deionization as an electrochemical means of saving energy and delivering clean water. Comparison to present desalination practices: Will it compete ?:, Electrochimica Acta 2010, 55 (12), 3845-3856.

Arellano et al., "Effects of pH on the degradation of aqueous ferricyanide by photolysis and photocatalysis under solar radiation", Solar Energy Materials and Solar Cells 2010, 94 (2), 327-332.

Ashrae Standard, "Method of Testing for Rating Desiccant Dehumidifiers Utilizing Heat for the Regeneration Process", 2007.

Bajpayee et al., "Very low temperature membrane-free desalination by directional solvent extraction", Energy Environ. Sci. 2011, 4 (5), 1672.

Beh et al., "A Neutral pH Aqueous Organic-Organometallic Redox Flow Battery with Extremely High Capacity Retention" ACS Energy Lett, 2017, 2, pp. 639-644.

Beh et al., U.S. Appl. No. 16/200,309, filed Nov. 26, 2018.

Beh et al., U.S. Appl. No. 16/378,769, filed Apr. 9, 2019.

Benedict et al., U.S. Appl. No. 16/200,376, filed Nov. 26, 2018.

Benedict et al., U.S. Appl. No. 16/386,389, filed Apr. 17, 2019.

Btmap-Vi et al., "Ordering and Customer Service Neutral pH Aqueous Redox Flow Battery Materials", Jan. 1, 2017, pp. 639.

Cheng et al., "Double-Stage Photovoltaic/Thermal ED Regeneration for Liquid Desiccant Cooling System", Energy and Buildings, 51, 2012, pp. 64-72.

Dai, "Increasing drought under global warming in observations and models", Nat. Clim.Change 2013, 3 (1), 52-58.

Darling et al., "Pathways to low-cost electrochemical energy storage: a comparison of aqueous and nonaqueous low batteries", Energy Environ. Sci. 2014, 7 (11), 3459-3477.

Desai et al., "Electrochemical Desalination of Seawater and Hypersaline Brines with Coupled Electricity Storage", ACS Energy Lett. 3, 2, 2018, pp. 375-379.

Desalination Experts Group, "Desalination in the GCC", 2014, 47 pages.

Dipaola, "Saudi Arabia Gets Cheapest Bids for Solar Power in Auction" Bloomberg, Jan. 16, 2018, 3 pages.

Ferguson et al., "Studies on Overvoltage. IX: The Nature of Cathode and Anode Discharge Potentials at Several Metal Surfaces1,2", J. Phys. Chem. 1937, 42 (2), 171-190.

Gong et al., "A zinc-iron redox-flow battery under $100 per kWh of system capital cost", Energy & Environmental Science, 2015. 5 pages.

Gong et al., All-Soluble All-Iron Aqueous Redox-Flow Battery, ACS Energy Letters, 2016, 1, pp. 89-93.

Gowin, "Examining the economics of seawater desalination using the DEEP code", Nuclear Power Technology Development Section, I. A. E. A., Ed. Vienna, Austria, 2000.

Gu et al., "A multiple ion-exchange membrane design for redox flow batteries", Energy Environ. Sci. 2014, 7 (9), 2986.

Hilbert et al., "Correlations between the Kinetics of Electrolytic Dissolution and Deposition of Iron: I . The Anodic Dissolution of Iron", Journal of The Electrochemical Society 1971, 118 (12), 1919-1926.

Howell et al., "Overview of the DOE VTO Advanced Battery R&D Program", Jun. 6, 2016 24 pages.

Hu et al, "Long-Cycling Aqueous Organic Redox Flow Battery (AORFB) toward Sustainable and Safe Energy Storage", Journal of the American Chemical Society 2017, 139 (3), 1207-1214.

International Search Report and Written Opinion dated Mar. 9, 2020 for PCT/2019/063157 dated Mar. 9, 2020, 16 pages.

International Search Report and Written Opinion dated Mar. 9, 2020 for PCT/US2019/062924, 17 pages.

John et al., "Seasonal cycles of temperature, salinity and water masses of the western Arabian gulf", Oceanol. Acta 1990, 13 (3), 273-281.

Khawaji et al., "Advances in seawater desalination technologies", Desalination 2008, 221 (1-3), 47-69.

(56) References Cited

OTHER PUBLICATIONS

Konopka et al., "Diffusion coefficients of ferri- and ferrocyanide ions in aqueous media, using twin-electrode thin-layer electrochemistry", Anal. Chem. 1970, 42 (14), 1741-1746.
Kozubal et al., "Low-Flow Liquid Desiccant Air-Conditioning: Demonstrated Performance and Cost Implications" NREL Technical Report, Sep. 2014, 104 pages.
La Mantia et al., "Batteries for efficient energy extraction from a water salinity difference", Nano Lett. 2011, 11 (4), 1810-3.
Lee et al., "Desalination of a thermal power plant wastewater by membrane capacitive deionization", Desalination 196, 2006, pp. 125-134.
Lee et al., "Rocking chair desalination battery based on Prussian blue electrodes", ACS Omega 2017, 2 (4), 1653-1659.
Li et al., "Photovoltaic-electrodialysis regeneration method for liquid desiccant cooling system", Solar Energy, vol. 83, 2009, pp. 2195-2204.
Logan et al., "Membrane-based processes for sustainable power generation using water", Nature 2012, 488, 313.
Loutatidou, et al., "Capital cost estimation of RO plants: GCC countries versus southern Europe", Desalination 2014, 347, 103-111.
Malhotra et al., "Use cases for stationary battery technologies: A review of the literature and existing projects", Renewable and Sustainable Energy Reviews 56, 2016, pp. 705-721.
McGovern et al., "On the cost of electrodialysis for the desalination of high salinity feeds", Applied Energy 136, Dec. 2014, pp. 649-661.
Moore et al., "Evaporation from Brine Solutions Under Controlled Laboratory Conditions; Report 77 for the Texas Water Development Board", May 1968, 77 pages.
Nair et al., "Water desalination and challenges: The Middle East perspective: a review", Desalin. Water Treat. 2013, 51 (10-12), 2030-2040.
Oren, "Capacitive deionization (CDI) for desalination and water treatment—past, present and future (a review)", Desalination 2008, 228 (1-3), 10-29.
Pasta et al., "A desalination battery" Nano Lett.2012, 12 (2), 839-43.
Patil et al., "Diffusivity of some zinc and cobalt salts in water", J. Chem. Eng. Data 1993, 38 (4), 574-576.
Sadrzadeh et al., "Sea water desalination using electrodialysis", Desalination 2008, 221 (1), 440-447.
Sata, "Application of Ion Exchange Membranes. In Ion Exchange Membranes: Preparation, Characterization, Modification and Application", The Royal Society of Chemistry: Cambridge, 2004.
Schaetzle et al., "Salinity Gradient Energy: Current State and New Trends", Engineering, vol. 1, Issue 2, Jun. 2016, pp. 164-166.
Scialdone et al., "Investigation of electrode material—redox couple systems for reverse electrodialysis processes—Part II: Experiments in a stack with 10-50 ce", Journal of Electroanalystical Chemistry, vol. 704, Jun. 14, 2013, pp. 1-9.
Epsztein et al., "Activation behavior for ion permeation in ion-exchange membranes: Role of ion dehydration in selective transport", Journal of Membrane Science 580, 2019, pp. 316-326.
Kaibara et al., Study of Ion Transport across Amphoteric Ion Exchange Membrane. II. Transport of Symmetric Tetraalkylammonium Chlorides?,, Bull. Chem. Sco. Jpn, 56, 1983, pp. 1346-1350.
Wang et al., "Continuous desalination with a metal-free redox-mediator", Journal of Materials Chemistry A, No. 7, 2019, 7 pages.
U.S. Office Action for U.S. Appl. No. 16/200,309, filed Apr. 20, 2022; 23 pgs.
Abdollahi and Shams, "Optimization of shape and angle of attack of winglet vortex generator in a rectangular channel for heat transfer enhancement," Applied Thermal Engineering, 2015;81:376-387.
Ashrae, et al., "Desiccant Dehumidification and Pressure Drying Equipment," 2012 ASHRAE Handbook-HVAC Systems and Equipment, Chapter 24, pp. 24.1-24.12.
Biswas and Chattopadhyay, Heat Transfer in a Channel with Built-In Wing-Type Vortex Generators, Int J Heat Mass Transfer, 1992;35(4):803-814.
Biswas et al., "Numerical and experimental determination of flow structure and heat transfer effects of longitudinal vortices in a channel flow," Int J Heat Mass Transfer, 1996;39(16):3441-3451.
Chen et al., "Experimental and numerical heat transfer investigation of an impingement jet array with V-ribs on the target plate and on the impingement plate," Intl J Heat Fluid Flow, 2017;68:126-138.
Cheng et al., "Experimental investigation of an electrodialysis regenerator for liquid desiccant", Energy and Buildings, (2013); 67:419-425.
Cheng et al., "Performance analysis of a new desiccant pre-treatment electrodialysis regeneration system for liquid desiccant", 2013 , Elsevier, 66, 1-15 (Year: 2013).
Conde-Petit and Weber, "Open Absorption System for Cooling and Air Conditioning using Membrane Contactors—Annual Report 2006," Publication No. 260098, Project: 101310—Open Absorption System for Cooling and Air Conditioning using Membrane Contactors, Date of publication: Nov. 14, 2006, Contractor: M. Conde Engineering, 13 pages.
Conde-Petit and Weber, "Open Absorption System for Cooling and Air Conditioning Using Membrane Contactors—Final Report," Publication No. 280139, Project: 101310—Open Absorption System for Cooling and Air conditioning using Membrane Contactors, Date of publication: Jul. 8, 2008, Contractor: M. Conde Engineering. 50 pages.
Conde-Petit, M. "Liquid Desiccant-Based Air-Conditioning Systems—LDACS," Proc. of the 1st European Conference on Polygeneration—Technologies and Applications, 217-234, A. Coronas, ed., Tarragona—Spain, Oct. 16-17, 2007 Published by Crever-Universitat, 17 pages.
Conde-Petit, M. Open Absorption Systems for Air-Conditioning using Membrane Contactors, Proceedings '15. Schweizerisches Status—Seminar Energie-und Umweltforschung im Bauwesen', Sep. 11-12, 2008—ETH Zurich, Switzerland. Published by Brenet-Eggwilstr. 16a, CH-9552 Bronschhofen-Switzerland {brenet@vogel-tech.ch), 12 pages.
Conde-Petit, Manuel, "Open Absorption System for Cooling and Air Conditioning using Membrane Contactors—Annual Report 2005," Publication No. Publication 260097, Project: 101310—Open Absorption System for Cooling and Air conditioning using Membrane Contactors, Date of publication: Jan. 31, 2006, Contractor: M. Conde Engineering, 8 pages.
Cooling tower Fill material: Gain a Deep Understanding, Linquip Technews, available online [retrieved on Mar. 22, 2001]. Retrieved from the Intenet: URL: https://www.linquip.com/blog/cooling-tower-fill-materiala/; 3 pgs.
Dean and Lowenstein, "A Solar Liquid-Desiccant Air Conditioner for Low-electricity Humidity Control—Summary Report," Energy and Water Projects Demonstration Plan SI-0822; TP-7 M0-56437-2, Nov. 2012; 41 pgs.
Ebrahimi et al., "Numerical study of liquid flow and heat transfer in rectangular microchannel with longitudinal vortex generators," Applied Thermal Eng, 2015;78:576-583.
European Search Report for EP22151282.5 issued by the European Patent Office, dated Jun. 3, 2022; 10 pgs.
Extended European Search Report for European Application No. 22157879.4, dated Aug. 26, 2022, 10 pages.
Friedman et al. "Mapping Microscale Chemical Heterogeneity in Nation Membranes with X-ray Photoelectron Spectroscopy," Journal of the Electrochemical Society, (2018); 165(11):733-741.
Gao et al., "A review on integration and design of desiccant air-conditioning systems for overall performance improvements," Renewable and Sustainable Energy Reviews, Feb. 23, 2021; 141:110809: 25 pgs.
Gentry and Jacobi, "Heat Transfer Enhancement on a Flat Plate using Delta-Wing Vortex Generators," ACRC Project 40, Jul. 1995:109 pgs.
Guler et al. "Performance-determining membrane properties in reverse electrodialysis", Journal of Membrane Science, (2013); 446:266-276.

(56) References Cited

OTHER PUBLICATIONS

International Preliminary Report of Patentability for International Application No. PCT/US2019/062924, dated May 25, 2021, 9 pages.
Invitation to Pay Additional Fees for International Application PCT/US2022/82272, dated Apr. 7, 2023, 02 pages.
Li et al., "Numerical simulation on flow and heat transfer of fin-and-tube heat exchanger with longitudinal vortex generators," IntIJThermalSci; 2015;92:85-96.
Li, F., et al., "Novel spacers for mass transfer enhancement in membrane separations," Journal of Membrane Science, May 2005; 253{1-2}: 1-12.
Ling, Y., et al., "CFD simulation of fluid flow through spacer-filled membrane module: selecting suitable cell types for periodic boundary conditions," Desalination, 2008; 233(1):351-358.
Lu et al., "Numerical simulation on performances of plane and curved winglet-Pair vortex generators in a rectangular channel and field synergy analysis," Intl J Thermal Sci, 2016;109:323-333.
Office Action for Japanese Application No. JP20210527145 dated Dec. 12, 2022, 6 pages.
Office Action from U.S. Appl. No. 16/200,309 dated Nov. 10, 2020, 26 pages.
Patankar and Prakash, "An Analysis of the Effect of Plate Thickness on Laminar Flow and Heat Transfer in Interrupted-Plate Passages," Intl J Heat Mass Transfer, 1981;24(11):1801-1810.
Shamshery et al., "Modeling the future of irrigation: A parametric description of pressure compensating drip irrigation miller performance," PLoS One, 2017; 12{4}: e0175241: 24 pgs.
Song et al., "Interaction of counter rotating longitudinal vortices and the effect on fluid flow and heat transfer," Intl J Heat Mass Transfer, 2016;93:349-360.
Tiggelbeck et al., "Experimental investigations of heat transfer enhancement and flow losses in a channel with double rows of longitudinal vortex generators," Intl J Heat Mass Transfer, 1993;36(9):2327-2337.
Two Stage Regenerator, AIL Research, Inc., available online [retrieved on Mar. 1, 2022]. Retrieved from the Internet: URL: http://ailr.com/our-technology/two-stage-regenerator/; 1 pg.
U.S. Notice of Allowance for U.S. Appl. No. 16/200,376, dated Jun. 30, 2021, 11 pages.
U.S. Notice of Allowance for U.S. Appl. No. 16/200,376, dated Mar. 22, 2021, 13 pages.
Vitillo et al., "Flow analysis of an innovative compact heat exchanger channel geometry," Intl J Heat Fluid Flow, 2016;58:30-39.
Wu and Tao, "Effect of longitudinal vortex generator on heat transfer in rectangular channels," AppliedThermalEngineering;2012;37:67-72.
Wu and Tao, "Numerical Study on laminar convection heat transfer in a channel with longitudinal vortex generator. Part B: Parametric study of major influence factors," Intl J Heat Mass Transfer, 2008;51:3683-3692.
Zhang et al., "Performance optimization of heat pump driven liquid desiccant dehumidification systems," Energy and Buildings, Jun. 9, 2012;52:132-144.
Zhang et al., "The mechanism of heat transfer enhancement using longitudinal vortex generators in a laminar channel flow with uniform wall temperature," Intl J Thermal Sci, 2017;117:26-43.
Scialdone et al., "Investigation of electrode material—Redox couple systems for reverse electrodialysis processes. Part I: Iron redox couples", Journal of Electroanalytical Chemistry 2012, 681 (Supplement C), 66-75.
Seto et al., "Seawater desalination by electrodialysis", Desalination 1978, 25 (1), 1-7.
Solveichik, "Flow batteries: current status and trends", Chem. Rev. 2015, 115 (20), 11533-58.
Stillwell et al., "Predicting the specific energy consumption of reverse osmosis desalination", Water 2016, 8 (12).
Urban, "Emerging Scientific and Engineering Opportunities within the Water-Energy Nexus", Joule, Dec. 20, 2017, pp. 665-688.
US Dept. of Energy, "Desiccant Enhanced Evaporative Air-Conditioning (DEVap): Evaluation of a New Concept in Ultra Efficient Air Conditioning", Technical Report NREL/TP-5500-49722, 2011.
US Dept. of Energy, "Energy Savings Potential and RD&D Opportunities for Commercial Building HVAC Systems", Dec. 2017, 172 pages.
US Dept. of Interior/US Geological Survey, Estimated Use of Water in the United States in 2010, 2014, 64 pages.
Vermaas et al., "High Efficiency in Energy Generation from Salinity Gradients with Reverse Electrodialysis", ACS Sustainable Chem. Eng. 1, 2013, pp. 1295-1302.
Viswanathan et al., "Cost and performance model for redox flow batteries", Journal of Power Sources, vol. 247, Dec. 23, 2012, pp. 1040-1051.
Woods, "Membrane processes for heating, ventilation, and air conditioning", Renewable and Sustainable Energy Reviews, vol. 33, 2014, pp. 290-304.
Wu et al., "Kinetic study on regeneration of Fe(II)EDTA in the wet process of NO removal", Chemical Engineering Journal 2008, 140 (1), 130-135.
Ye et al., "Performance of a mixing entropy battery alternately flushed with wastewater effluent and seawater for recovery of salinity gradient energy", Energy Environ. Sci. 2014, 7 (7), 2295-2300.
Zhang et al., "A Natural Driven Membrane Process for Brackish and Wastewater Treatment: Photovoltaic Powered ED and FO Hybrid System", Environmental Science and Technology, Sep. 4, 2013, pp. 10548-10555.
Google Search dated Mar. 9, 2021, 2 pages.
European Office Action for European Application No. 19828928.2, dated Sep. 7, 2023, 8 pages.
Mathsisfun "Polygons" 7 pages, 2020, https://www.mathsisfun.com/geometry/polygons.html#:~:text=Polygons%20are%202-dimensional%20shapes.%20They%20are%20made%20of,Greek.%20Poly-%20means%20%22many%22%20and%20-gon%20means%20%22angle%22, 7 pages (Year: 2020).
Office Action for Brazilian Application No. BR20211108850 dated Jun. 23, 2023, 4 pages.
Office Action for Japanese Application No. JP20210527145 dated May 11, 2023, 20 pages.
Office Action for Japanese Application No. JP20210527145 dated Sep. 11, 2023, 12 pages.
Extended European Search Report for EP 22150661.1 issued by the European Patent Office dated Jun. 9, 2022; 14 pgs.
Petrova et al., "Perfluorinated hybrid membranes modified by metal decorated clay nanotubes", Journal of Membrane Science, vol. 582, Jul. 15, 2019, pp. 172-181.
Pismenskaya et al., "Can the electrochemical performance of heterogeneous ion-exchange membranes be better than that of homogeneous membranes?", Journal of Membrane Science, vol. 566, Nov. 15, 2018, pp. 54-68.
Shah et al., "Comparative Studies on Performance of Interpolymer and Heterogeneous Ion-Exchange Membranes for Water Desalination by Electrodialysis", Desalination 172, 2005, pp. 257-265.
Office Action for Israel Application No. IL20210282990 dated Apr. 16, 2024, 3 pages.

* cited by examiner

ELECTRODIALYTIC LIQUID DESICCANT DEHUMIDIFYING SYSTEM

RELATED APPLICATIONS

This application is a continuation of U.S. Ser. No. 16/200,376, filed Nov. 26, 2018, which is incorporated herein by reference in its entirety.

SUMMARY

The present disclosure is directed to an electrodialytic liquid desiccant dehumidifying system. In one embodiment, a liquid desiccant system includes an electrodialytic stack with a liquid desiccant loop having a diluted stream and a concentrated stream of liquid desiccant separated by a central ionic exchange membrane. A redox shuttle loop with first and second redox streams is separated from the diluted stream and the concentrated stream of the liquid desiccant loop by respective first and second outer ionic exchange membranes of a different type than the central ionic exchange membrane.

The liquid desiccant system includes first and second electrodes that are operable to apply a voltage across the electrodialytic stack. The system has an air-liquid interface in fluid communication with the concentrated stream of the liquid desiccant. The air-liquid interface exposes the concentrated stream of the liquid desiccant to air flowing across the air-liquid interface, the concentrated stream being diluted via absorption of water from the air to form an output stream.

The liquid desiccant system may include a first pump that circulates the liquid desiccant through the electrodialytic stack and the air-liquid interface. The output stream from the air-liquid interface may be split into the diluted stream and the concentrated stream upon entry into the electrodialytic stack. A second pump may be used to circulate the first and second redox streams across the first and second outer ion exchange membranes.

In another embodiment, a method involves circulating a liquid desiccant through an air-liquid interface. Air flows across the air-liquid interface such that the liquid desiccant absorbs water from the air. The liquid desiccant is diluted via the absorption of the water to form an output stream. The output stream is split to a diluted stream and a concentrated stream at an input to an electrodialytic stack. The electrodialytic stack has a central ionic exchange membrane and first and second outer ionic exchange membrane of a different type than the central ionic exchange membrane. The diluted stream flows between the central ionic exchange membrane and the first outer ionic exchange membrane and the concentrated stream flows between the central ionic exchange membrane and the second outer ionic exchange membrane. A redox shuttle loop circulates around the first and second outer ionic exchange membranes. A voltage is applied across the electrodialytic stack, e.g., to cause ionic movement across the central ionic exchange membrane and the first outer ionic exchange membrane resulting in a desiccant concentrate moving from the diluted stream to the redox shuttle loop and to the concentrated stream.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

DETAILED DESCRIPTION

The present disclosure relates to liquid desiccant systems. A liquid desiccant system may be used in, among other things, heating, ventilation, and air-conditioning (HVAC). Air conditioning is responsible for nearly 10% of U.S. electricity consumption, with dehumidification accounting for more than half of the load in humid regions. The present disclosure describes an efficient thermodynamic approach to dehumidification for air conditioning. Generally, a system includes a membrane dehumidifier in tandem with a redox-assisted electrodialysis liquid desiccant concentrator.

The systems described herein take advantage of a redox-assisted electrodialysis process that enables a membrane-based liquid desiccant air conditioning system. In this redox-assisted electrodialysis (ED) process, an aqueous solution of a redox-active species is circulated between the anode and cathode of an electrochemical stack to concentrate ionic solutions, eliminating thermodynamic phase changes driven by heat or pressure necessary for vapor compression (VC) or desiccant based air conditioning. Liquid desiccants (e.g., aqueous solutions of lithium chloride, LiCl) will absorb moisture from air across a membrane interface. Diluted liquid desiccants will be efficiently re-concentrated, avoiding the latent heat input required to evaporate water. It is estimated that the enhanced efficiency of this new proposed cycle leads to 1.5 Quads of energy savings yearly by 2030.

Figure 1:
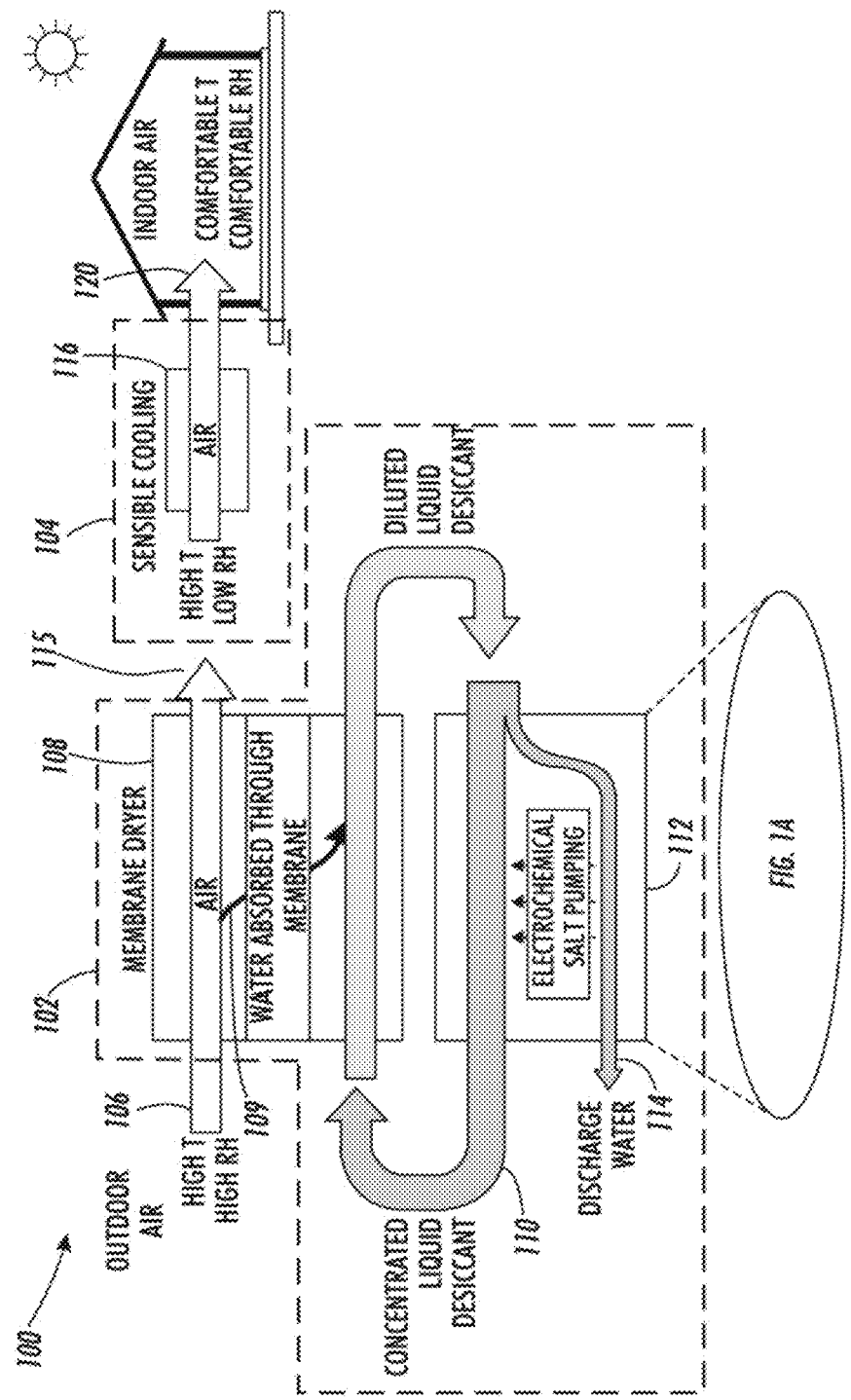
FIGS. 1 and 1A are diagrams of a liquid desiccant system according to an example embodiment.

In FIG. 1, a diagram illustrates an electrodialytic liquid desiccant air conditioning (ELDAC) system 100 according to an example embodiment. The system 100 includes a desiccant section 102 and a cooling section 104. In the desiccant section 102, outdoor air 106 (and/or recirculated air) is forced across a liquid-carrying membrane dryer 108, also referred to herein as an air-liquid interface. The air 106 may be outside air of high temperature and high relative humidity (RH). Water 109 from the air 106 is absorbed at the membrane interface 108 into a concentrated liquid desiccant 110, e.g., of aqueous LiCl, is then passed through a redox-assisted regenerator 112 to separate dilute stream 114 (e.g., discharge water) and re-concentrate the desiccant stream 110. Other concentrates may be used for the desiccant instead of LiCl, e.g., NaCl, LiBr, and $CaCl_2$).

The humidity is reduced in the air 115 leaving the desiccant section 102, wherein it is cooled by the cooling section 104. This cooling section 104 may include an evaporator 116 and other components not shown (e.g., condenser, compressor). Because the air 115 entering the cooling section 104 has lower relative humidity compared to the outside/recirculated air 106, the evaporator 116 is more efficient and can reduce the temperature of the cooled air 120 by a greater amount than if the evaporator 116 had to also condense moisture from the incoming air 115. Experimental results measuring the energy used by redox-assisted electrodialysis to concentrate ionic aqueous solutions show that ELDAC system 100 can have a regeneration specific heat input (RSHI) less than 0.05 kBTU/lb, which is up to 30 times lower than currently used thermal regeneration methods.

Figure 1A:
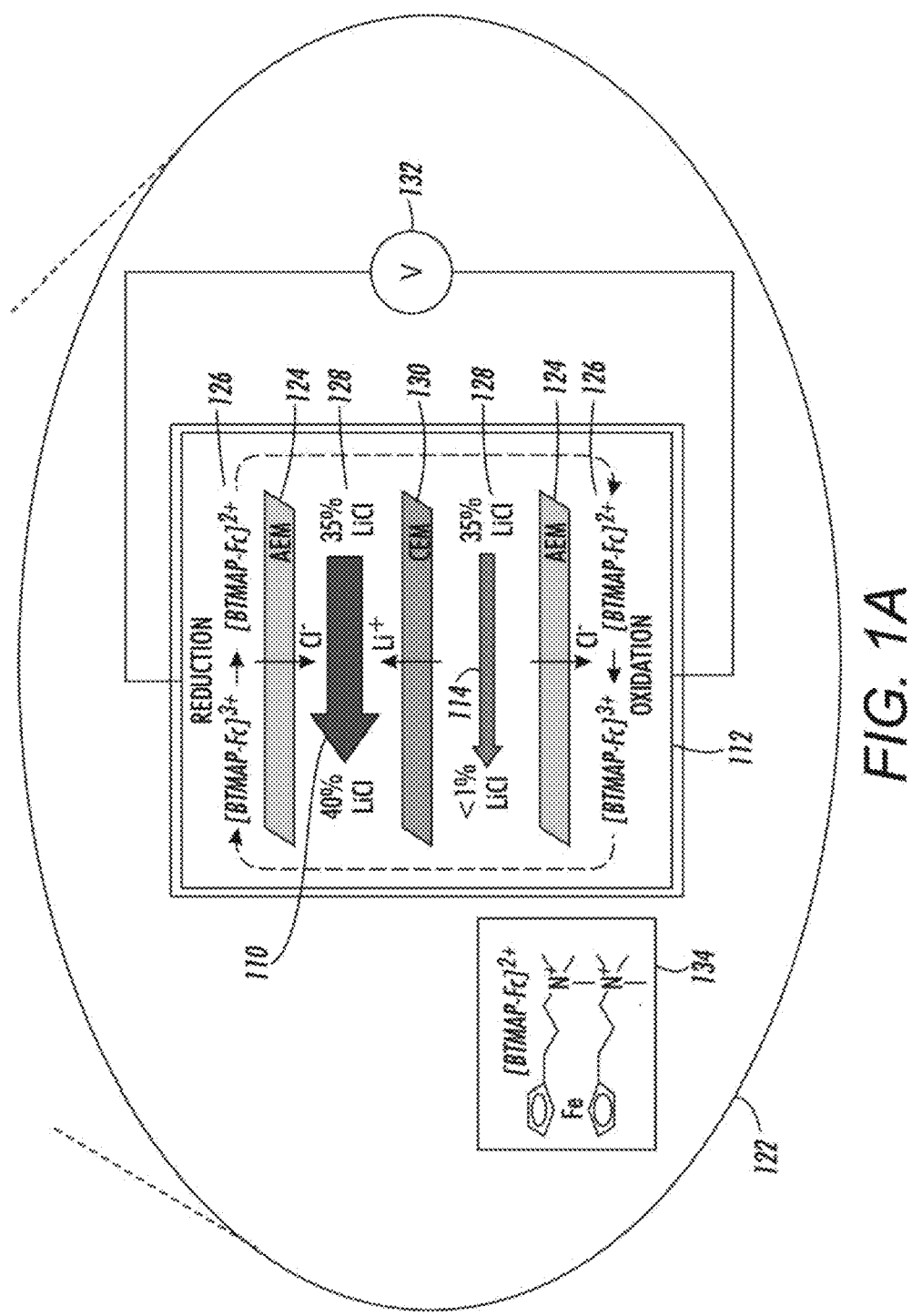

As seen in the detail view 122 of FIG. 1A, redox-assisted regenerator 112 has two outer ion exchange membranes 124 that separate the outer redox channels 126 from the inner concentrate 110 and dilute 114 streams. In this example the outer ion exchange membranes 124 are configured as anion exchange membranes (AEM). The concentrate 110 and dilute 114 streams are separated by a central ion exchange membrane 130, which in this example is a cation exchange membrane (CEM). In other configurations, the central ion exchange membrane 130 may be an AEM and the outer membranes 124 may be CEMs.

An external voltage 132 induces oxidation or reduction in redox-active shuttle molecules, driving ion movement across the membranes 124, 130 without splitting water or producing other gaseous by products (e.g. chlorine) and creating two streams: re-concentrated desiccant 110 and discharge water 114. This goal can be achieved over multiple stages. One proposed redox shuttle is a positively charged ferrocene derivative such as (bis(trimethylammoniopropyl) ferrocene/bis(trimethylammoniopropyl) ferrocenium, [BTMAP-Fc]$^{2+}$/[BTMAP-Fc]$^{3+}$) 134, which is non-toxic, highly stable, has very rapid electrochemical kinetics and negligible membrane permeability. Other redox shuttle solutions may include ferrocyanide/ferricyanide ([Fe(CN)$_6$]$^{4-}$/[Fe(CN)$_6$]$^{3-}$) or a negatively charged ferrocene derivative. The moving parts of the system may include low pressure pumps for liquid circulation and fans for air circulation. Additional details of this type of four-channel, electrodialytic, stack with redox shuttle assist can be found in commonly-owned U.S. patent application Ser. No. 16/200,289, which is hereby incorporated by reference in its entirety.

Figure 2:
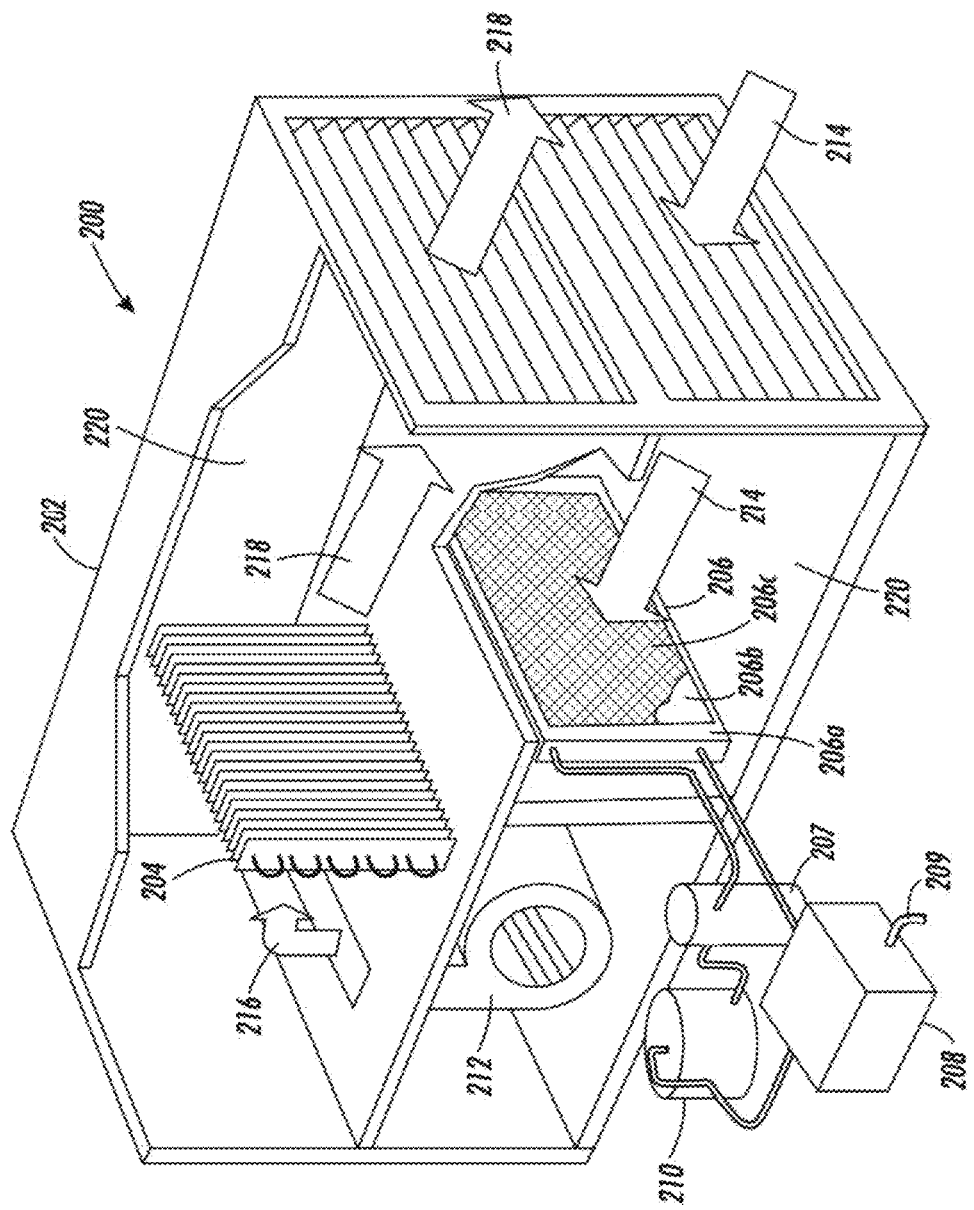
FIG. 2 is a perspective view of an air conditioning system according to an example embodiment.
Figure 3:
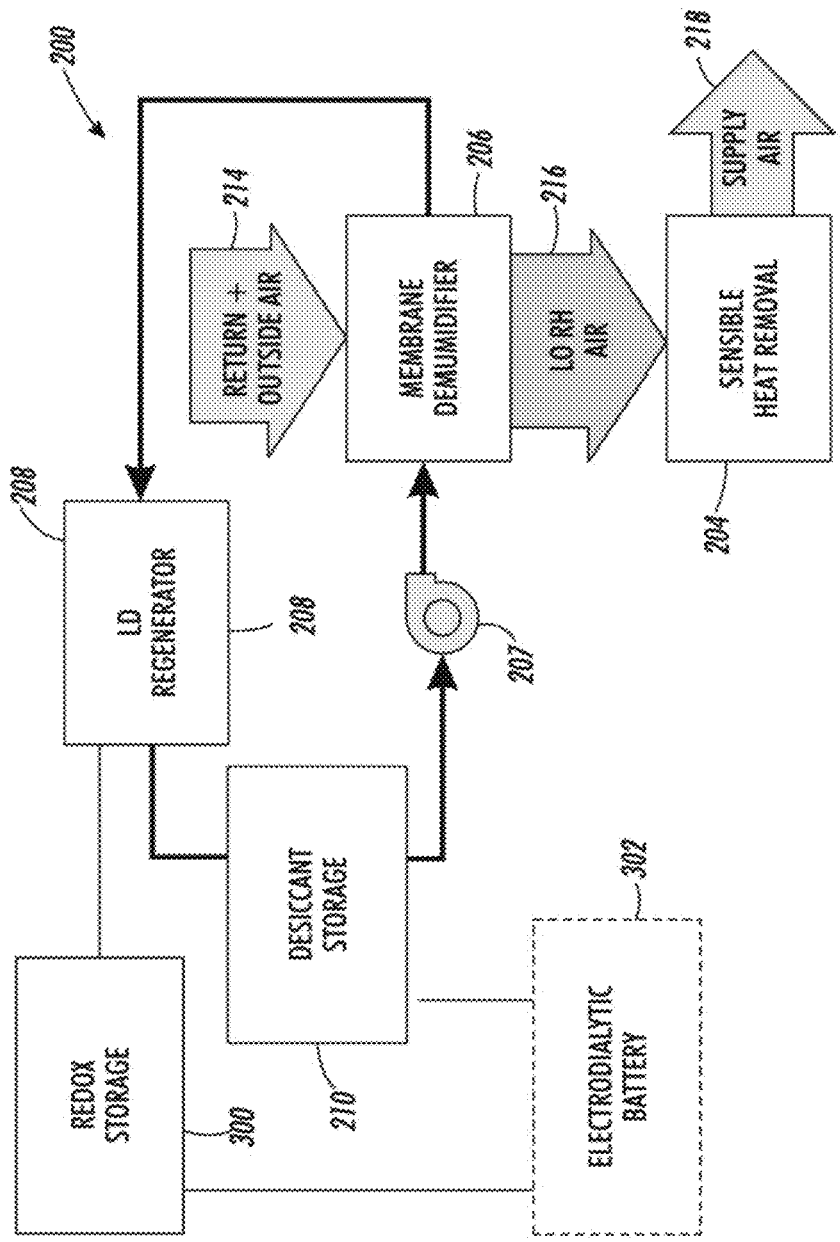
FIG. 3 is a block diagram of an air conditioning system according to an example embodiment.

In FIG. 2, a perspective view shows details of an ELDAC system 200 according to an example embodiment. In FIG. 3, a block diagram shows functional relations between some of the components shown in FIG. 2, as well as showing other components according to additional embodiments. The system 200 includes an enclosure 202 that holds various functional components and provides air duct paths. Humidified air 214 (e.g., outside and/or return air) is directed through a first duct 220 via an air blower 212. This air 214 is forced across an air-liquid interface dehumidifier 206. In this example, the dehumidifier 206 is configured as a rectangular membrane element that fills the first duct 220.

Within a frame 206a of the dehumidifier 206 are one or more planar membranes 206b through which liquid desiccant is circulated. In other embodiments, hollow tube, liquid-to-air surfaces, liquid spray, may be used in the dehumidifier 206 instead of or in addition to a planar membrane 206b. Movement of the fluid desiccant through the membrane 206b may be accomplished using any combination of capillary action, gravity feed, direct pumping of the liquid, etc. A grill 206c may be provided for mechanical support of the membrane 206b to reduce flexing caused by air pressure from air flow 214. A liquid pump 207 is used to move the liquid desiccant from an optional storage tank 210 to the membrane dehumidifier 206, where it absorbs water from the air 214 and is fed back to a redox-assisted regenerator 208. The redox-assisted generator 208 separates water from the liquid desiccant, where the separated water is discharged via a drain 209. Note that while the components 207, 208, 210 and associated piping are shown outside the enclosure 202 for convenience of illustration, they may be partially or fully located within the enclosure 202.

The air 216 that has passed through the membrane dehumidifier 206 has low RH and so can be more efficiently processed by a sensible heat remover 204, e.g., an evaporator of a refrigerant-cycle air conditioner. The cooled air 218 that has passed through the sensible heat remover 204 passes through supply duct 220 where it exits the enclosure 202 and is used to cool a target space, e.g., building, vehicle, etc.

Note that in FIG. 3, a redox storage tank 300 is shown in fluid communication with the LD regenerator 208. The ELDAC system 200 may include one or both of the redox and desiccant reservoirs 300, 210. Note that the desiccant storage 210 may store fluid for both the concentrate stream and dilute stream (e.g., streams 110 and 114 in FIG. 1), by using separate reservoirs or a single reservoir with two or more partitions. The redox storage 300 may similarly store concentrated and dilute parts of the redox stream (e.g., bottom and top parts of stream 126 shown in FIG. 1). These reservoirs 210, 300 may be used as buffers in some embodiments. For example, if the water draining from the ELDAC system 200 does not equal the water being absorbed from the air, one of concentrated or diluted desiccant (or a combination of both) may be drawn from the reservoir 210 to ensure the desiccant loop maintains the desired concentrate levels and/or flow rates.

The reservoirs 210, 300 may be of sufficient capacity to be used for other purposes besides dehumidification. For example, as is described in U.S. patent application Ser. No. 16/200,289, an electrodialytic battery 302 may use the redox solutions 300 to generate electricity, thus recovering some of the electricity used in dehumidification. Such processes may be run together with or separately from dehumidification. For example, electricity generation may occur at night when the system is lightly utilized or shut off.

Figure 4:
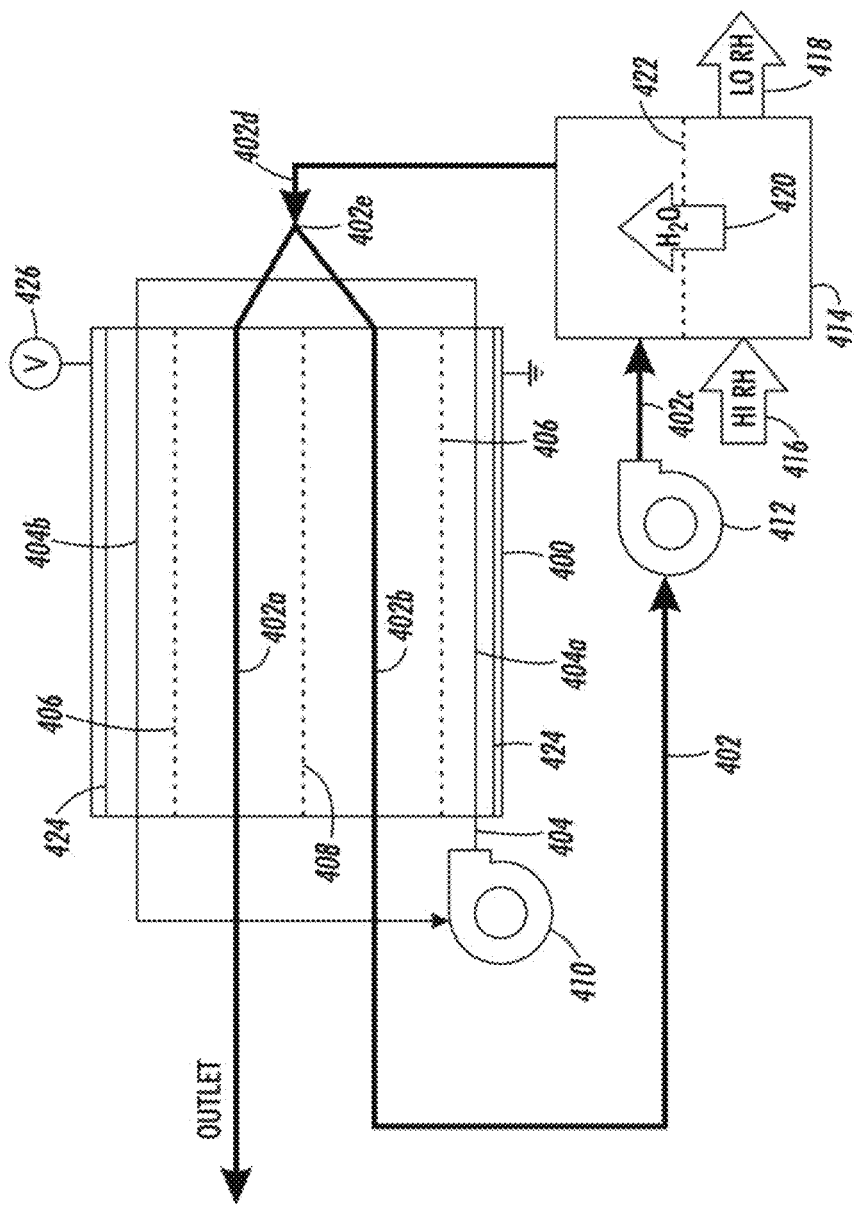
FIG. 4 is a diagram of a liquid desiccant system according to an example embodiment.

In FIG. 4, a diagram shows additional details of a liquid desiccant system according to an example embodiment. An electrodialytic stack 400 provides an enclosure for a liquid desiccant loop 402 and a redox shuttle loop 404. The loops 402, 404 are separated within the housing 400 by outer exchange membranes 406 and diluted/concentrate paths 402a, 402b of the liquid desiccant loop 402 are separated by a central exchange membrane 408. The fluids in the loops 402, 404 are driven by pumps 412, 410, respectively.

The liquid desiccant loop 402 starts with concentrated liquid desiccant at point 402c. The desiccant loop 402 includes an aqueous ionic solution such as lithium chloride in water. Typical starting concentrations will be ~30% desiccant by weight. The concentrated desiccant solution is brought into contact with an air-to-membrane interface/exchanger 414, such as the membrane dehumidifier 206 shown in FIGS. 2 and 3. At the exchanger 414, higher RH air 416 enters and lower RH air 418 leaves. Water vapor 420 from the air is pulled across a water selective membrane 422 (or other liquid-air interface) at the exchanger 414 by the desiccant thereby diluting the desiccant solution which exits at a lower concentration at point 402d.

At the electrodialytic stack 400, the lower concentration liquid desiccant solution 402d is split at junction 402e split into separate streams 402a, 402b that are brought into contact with the membranes 406, 408 of the stack 400. Stream 402b is concentrated as it passes through the stack 400 and reenters the pump 412 having the same concentration as point 402c. The other stream 402a is diluted as it passes through the stack 400 and leaves as a highly diluted stream of water which can be drained, stored, or used for some other purpose.

Figure 5A:
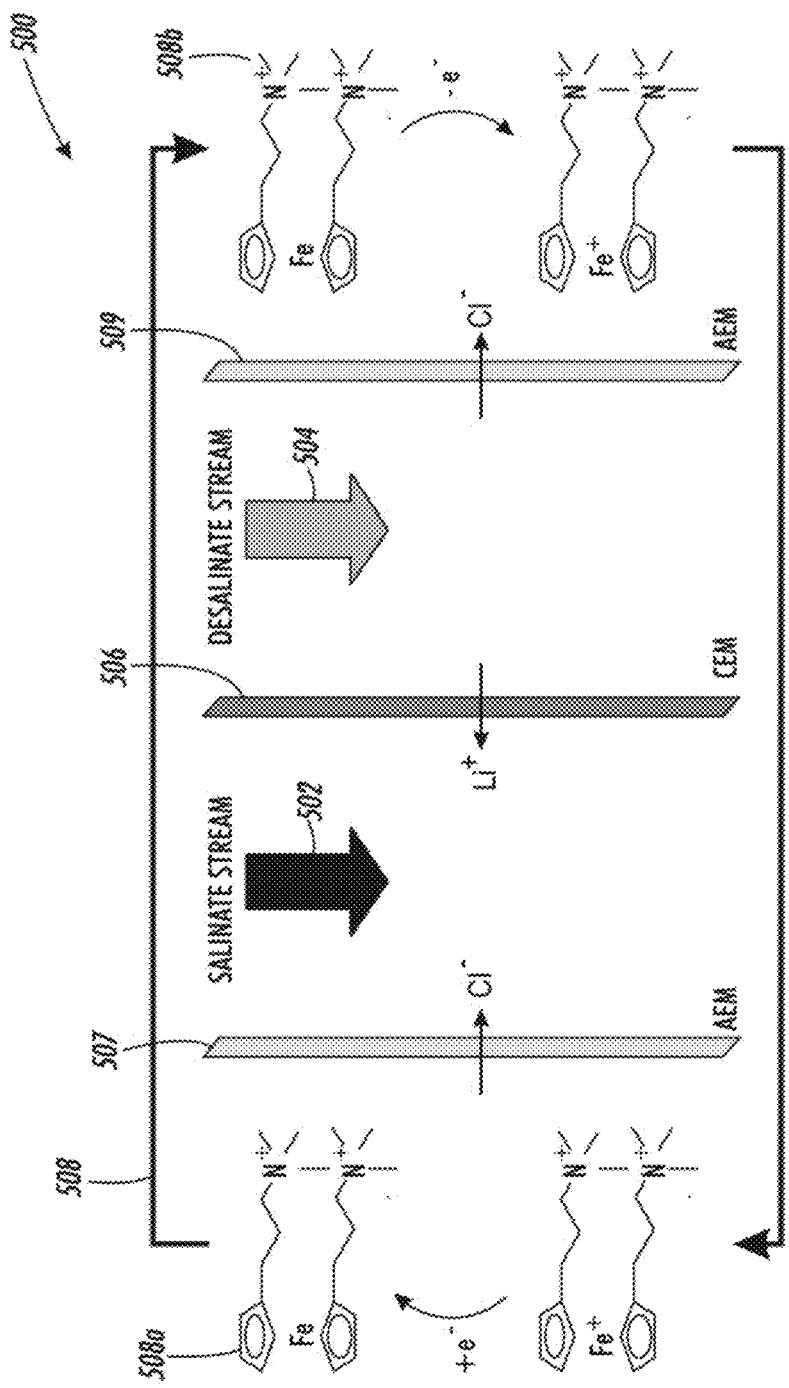
FIGS. 5A and 5B are diagrams of electrodialytic stacks according to example embodiments.

The pump 410 circulates the redox shuttle between points 404a and 404b, whereupon it comes into contact with electrodes 424. A voltage 426 applied across the electrodialytic stack drives ions from stream 402a to stream 402b, from stream 402a into stream 404b, and from stream 404a into stream 402b. In each case, driving the ions through the membranes 406, 408 affects the concentration. An alternate embodiment of an electrodialytic stack 500 is shown in FIG. 5A using LiCl as the desiccant concentrate and [BTMAP-Fc]$^{2+}$/[BTMAP-Fc]$^{3+}$ as the redox shuttle. The LiCl desiccant concentrate is split into a desalinate/diluted stream and a concentrated stream 504 by a central ionic exchange membrane 506, in this case a CEM. A redox shuttle loop 508 has first and second redox streams 508a-b separated from the diluted stream and the concentrated stream of the liquid desiccant loop by respective first and second outer ionic exchange membranes 507, 509 of a different type (in this case an AEM) than the central ionic exchange membrane 506.

Figure 5B:
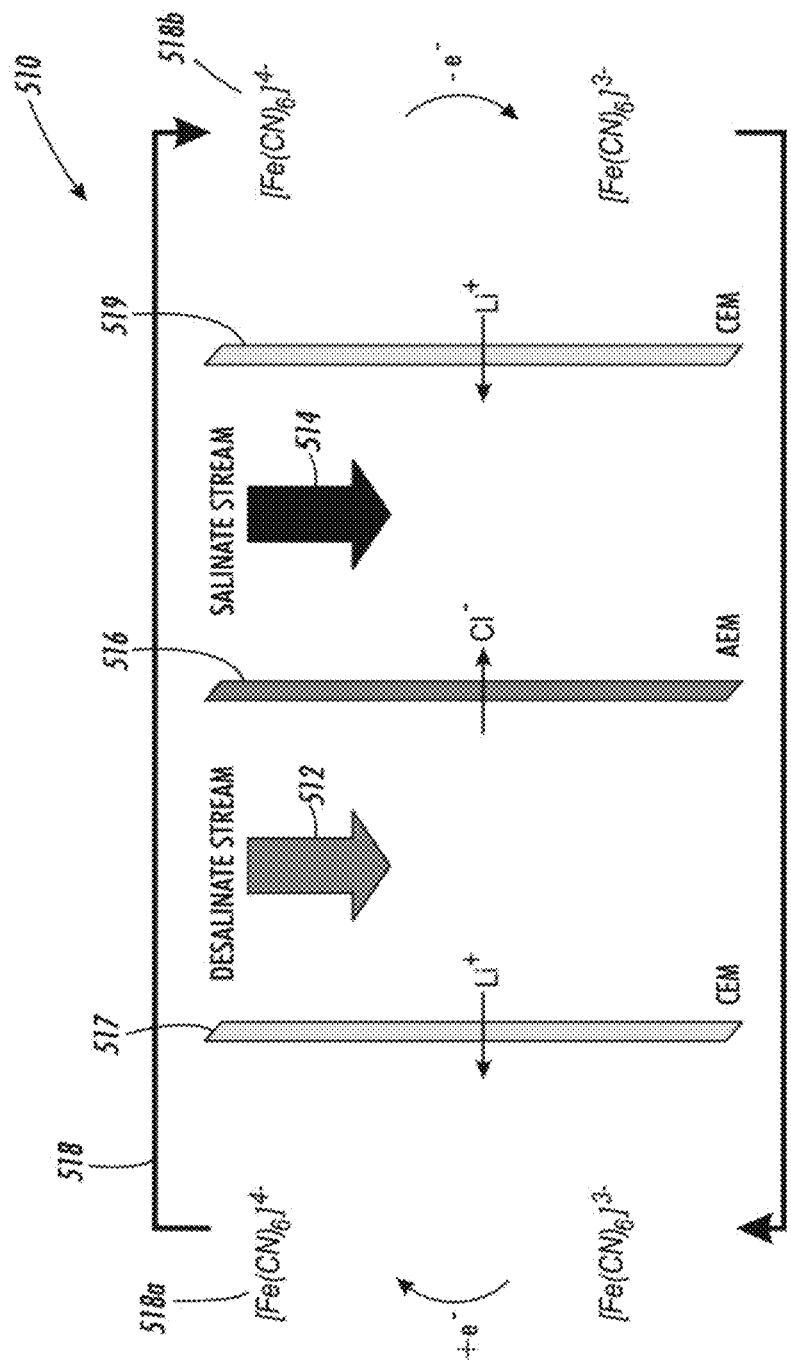

Another alternate embodiment of an electrodialytic stack 510 is shown in FIG. 5B using LiCl as the desiccant concentrate and [Fe(CN)$_6$]$^{4-}$/[Fe(CN)$_6$]$^{3-}$ as the redox shuttle. The LiCl desiccant concentrate is split into a desalinate/diluted stream and a concentrated stream 514 by a central ionic exchange membrane 516, in this case an AEM. A redox shuttle loop 518 has first and second redox streams 518a-b separated from the diluted stream and the concentrated stream of the liquid desiccant loop by respective first and second outer ionic exchange membranes 517, 519 of a different type (in this case a CEM) than the central ionic exchange membrane 516. Note that the electrodialytic stacks 500, 510 shown in FIGS. 5A and 5B can be used in any of the dehumidification loops shown herein.

The dehumidification part of the above-described system requires only input electricity for driving pumps and the electrodialytic stack as well as an input air stream to be dehumidified. There will be outlet streams of water and low RH air. The system is intended for use for dehumidification, although it may be adapted for additional uses, e.g., generating electricity from stored redox solution. A benefit is provided because ELDAC requires significantly less energy than existing dehumidification systems due to the use of electrodialytic concentration at zero or near-zero overpotential. Because the system does not rely on water splitting to drive ion motion, ELDAC does not generate any toxic or flammable gases (e.g. chlorine or hydrogen) when used on concentrated salt solutions unlike other electrochemical processes like conventional electrodialysis. An example application could be using ELDAC upstream from a normal air conditioner to eliminate the latent heat load to the air conditioner and lower air conditioning bills.

Figure 6:
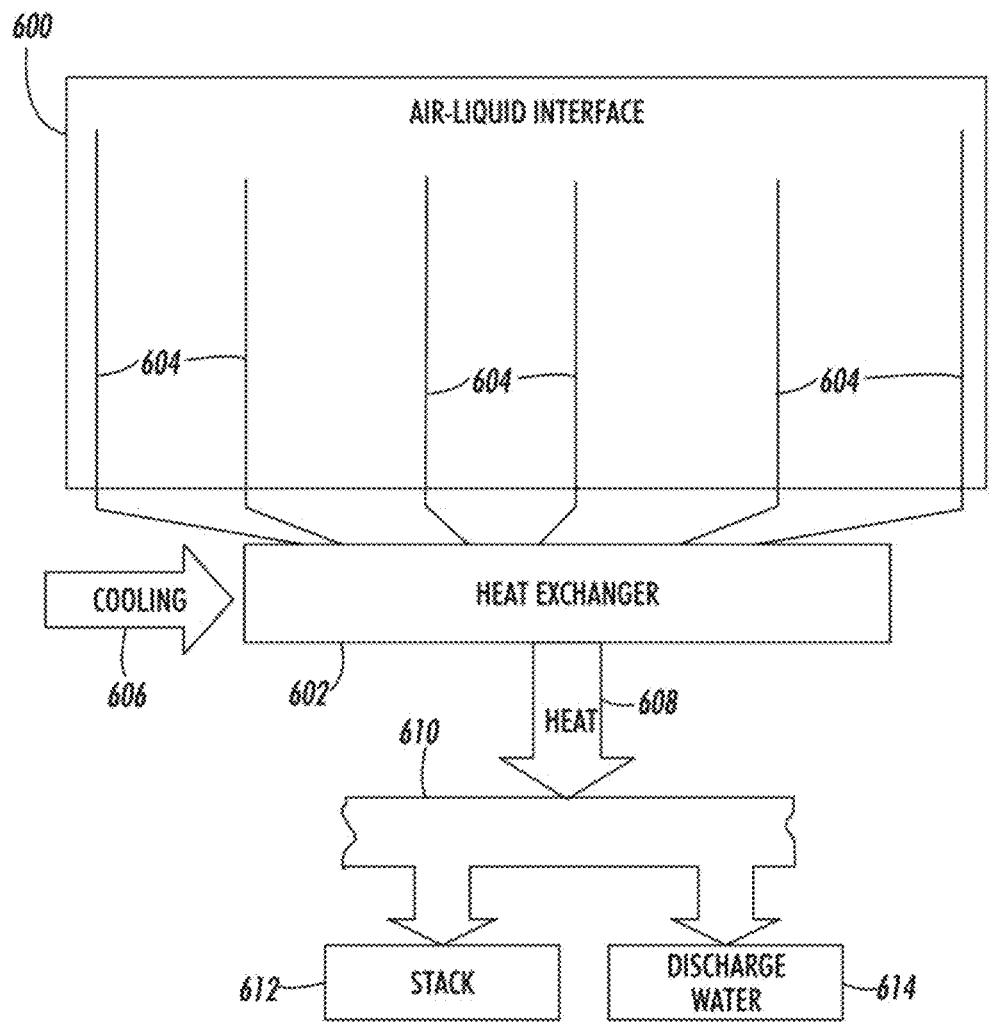
FIG. 6 is a diagram of a heat exchanger used with an air-liquid interface according to an example embodiment.

The absorption of the moisture in the liquid desiccant is exothermic, such that it will increase the temperature of the air-liquid interface that carries the liquid desiccant. This increase in temperature could result in increased loads on a sensible cooling section that receives air that passes through the air-liquid interface. In FIG. 6, a diagram shows a system for removing heat from an air-liquid interface 600 according to an example embodiment. A heat exchanger 602 is thermally coupled to heat transfer elements 604 that are distributed through parts (e.g., the membrane) of the interface 600.

The heat transfer elements 604 may be conductive strips (e.g., metals, carbon nanotubes, etc.), gas-filled or liquid-filled passive heat pipes (e.g., thermosiphon), tubes through which a gas or liquid is pumped, radiative heat absorbers, or other heat-carrying structures known in the art. The heat carried through elements 604 is delivered to the heat exchanger 602, which is subjected to a cooling flow 606. The cooling flow 606 is a gas or liquid flow that carries heat away from the heat exchanger 602 and ultimately may dump the heat to an ambient heat sink (e.g., air, soil, water). In other embodiments, the heat 608 may be transferred (e.g., along heat transfer path 610) to other heat sinks, such as an electrodialytic stack 612 (which may be the same stack that provides desiccant to the interface 600 or a different stack) and/or the discharge water 614 from the system (e.g., discharge water 114 in FIG. 1).

Figure 7:
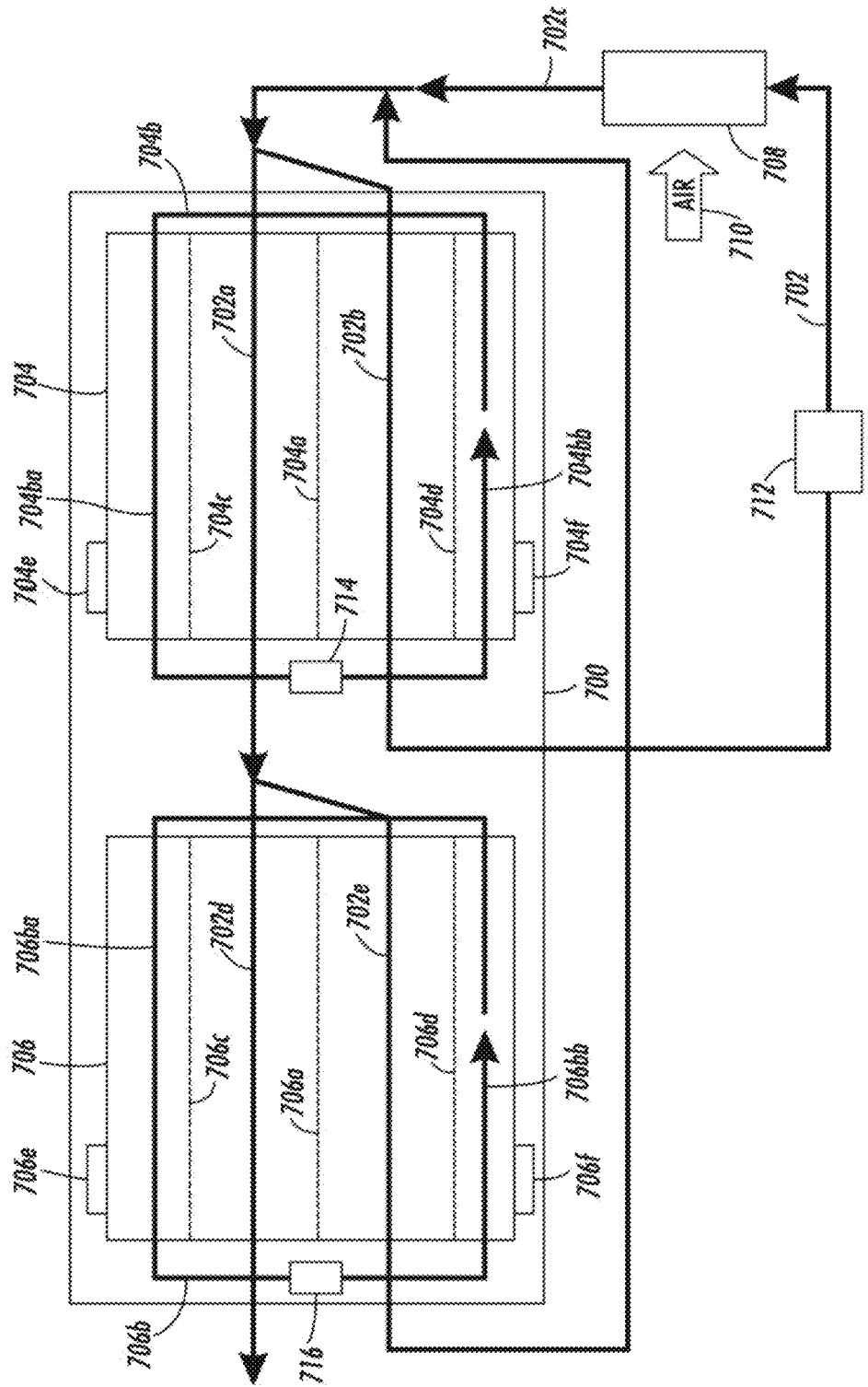
FIG. 7 is a diagram of a multi-stage electrodialytic stack according to an example embodiment.

In the previous example, an electrodialytic stack included a single redox loop. In other embodiments, a stack may include multiple redox loops and associated ionic membranes to further increase the level of dilution/concentration and/or to increase the amount of desiccant flow that can be treated. In FIG. 7, a block diagram shows a dual-stage electrodialytic stack 700 according to an example embodiment.

The electrodialytic stack 700 processes a liquid desiccant loop 702 that is split into a diluted stream 702a and a concentrated stream 702b that passes through a first stage 704. Stream 702a exiting stage 704 is further split into a second diluted stream 702d and a second concentrated stream 702e that passes through a second stage 706. Stream 702e exiting stage 706 is at a lower concentration than stream 702b exiting stage 704 and can be remixed with output stream 702c and reintroduced to the previous stage 704 instead of being remixed with 702b and reintroduced to the air-liquid interface 708. To maximize efficiency, the desiccant concentrations in streams 702c and 702e are about equivalent (e.g., within 0-20%).

Each of the stages 704, 706 has a central ionic exchange membrane 704a, 706a that separates the diluted streams 702a, 702d and the concentrated streams 702b, 702e. Each of the stages 704, 706 has a redox shuttle loop 704b, 706b with first and second redox streams 704ba, 704bb, 706ba, 706bb separated from the diluted streams 702a, 702d and the concentrated streams 702b, 702e of the liquid desiccant loop 702 by respective first and second outer ionic exchange membranes 704c, 704d, 706c, 706d. The stages 704, 706 each include first and second electrodes 704e, 704f, 706e, 706f that are operable to apply a voltage across the stages 704, 706 of the electrodialytic stack 700.

An air-liquid interface 708 is in fluid communication with the concentrated stream 702b of the liquid desiccant exiting the first stage 704. The air-liquid interface 708 exposes the concentrated stream 702b of the liquid desiccant to air flowing across the air-liquid interface 708, the concentrated stream being diluted via absorption of water from the air to form an output stream 702c. The output stream 702c is combined with the output stream 702e exiting the second stage 706. A first pump 712 circulates the liquid desiccant through the electrodialytic stack 700 and the air-liquid interface 708. After being combined with output stream 702e, the output stream 702c from the air-liquid interface 708 is split into the diluted stream 702a and the concentrated stream 702b upon entry into the electrodialytic stack 700.

The voltages across the electrodes 704e, 704f, 706e, 706f cause ionic movement across the central ionic exchange membranes 704a, 706a and the first outer ionic exchange membrane 704c, 706c resulting in a desiccant concentrate moving from the first diluted stream 702a to the first redox stream 704ba of stage 704 and to the first concentrated stream 702b, and similarly from the second diluted stream 702d to the first redox stream 706ba of stage 706 and to the second concentrated stream 702e. Second pumps 714, 716 circulate the redox shuttle loops 704b, 706b such that first redox streams 704ba, 706ba and second redox streams 704bb, 706bb flow across the respective first outer ion exchange membranes 704c, 706c and second outer ion exchange membranes 704d, 706d. The voltages will also cause a second (and similar) ionic movement across the second outer exchange membranes 704d, 706d that results in movement of the desiccant concentrate from the second redox streams 704bb, 706bb to the concentrated streams 702b, 702e.

Note that the stages 704, 706 may be the same or different. For example, each stage 704 may use a different combination of redox shuttle solution, center and outer exchange membrane type, voltage, membrane geometry, desiccant flow geometry, redox flow rate, etc. In this way, the stages 704, 706 can be optimized for different expected concentrations within the parts of the diluted streams 702a, 702d and concentrated streams 702b, 702e. The stages 704, 706 may operate at the same time, and one or the other may be shut off under some conditions. For example, if the concentrate level within the diluted stream 702a is below some threshold, one of the stages 704, 706 may be shut off to save energy and reduce wear. If the concentrate level within the diluted stream 702a goes above this threshold, the deactivated stage 704, 706 can be restarted.

The embodiment shown in FIG. 7 can be extended to more than two stages 704, 706. Further, while the stages 704, 706 are shown as part of a single electrodialytic stack unit 700, they may be implemented as separate enclosures that are coupled, e.g., by piping to carry the streams 702a, 702b, 702d, 702e of the desiccant loop 702. In one embodiment, one redox pump may be used instead of the two pumps 714, 716, e.g., by running loops 704b, 706b in parallel or in series. Note that a multistage electrodialytic stack such as shown in FIG. 7 may be used in any of the embodiments shown previously (e.g., FIGS. 1-5) and may incorporate any features shown in those and other figures, e.g., fluid storage reservoirs, heat exchangers, etc.

Figure 8:
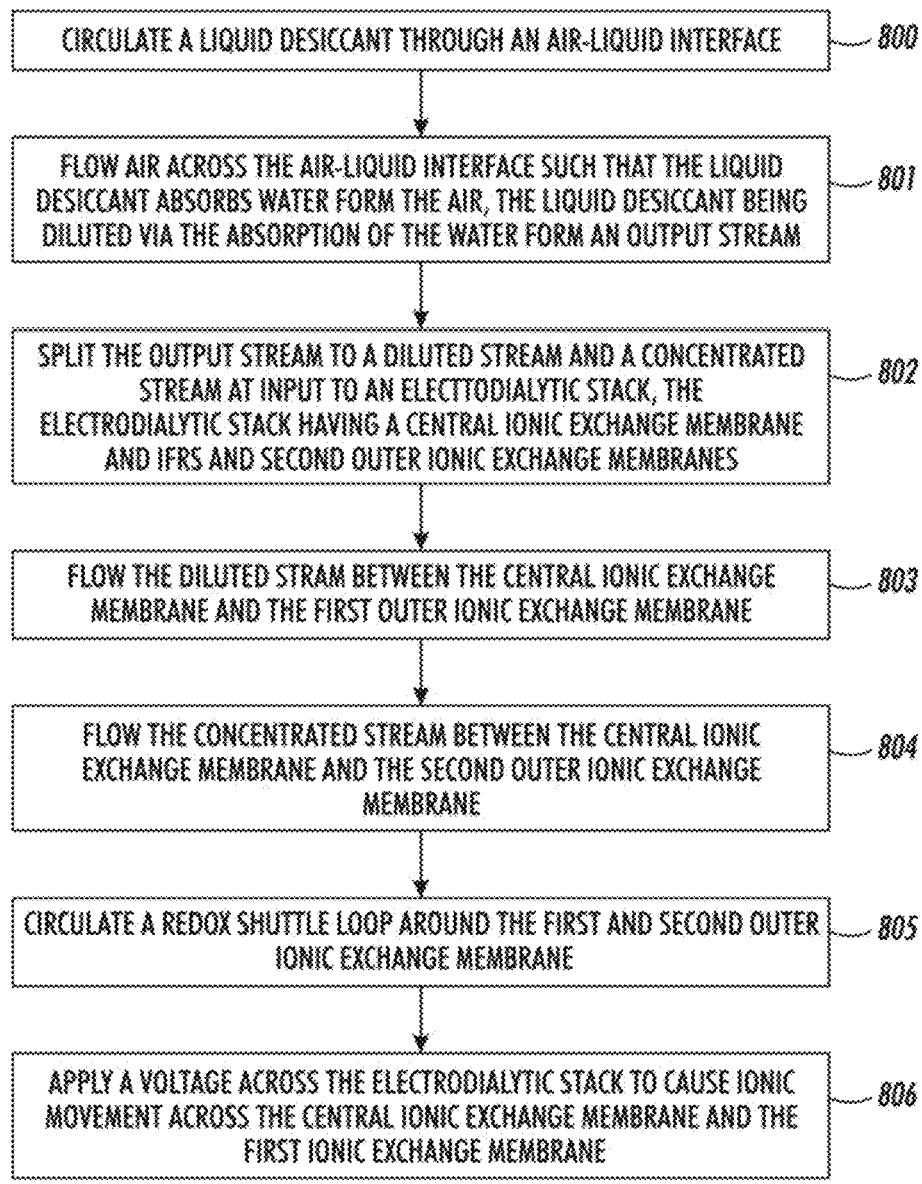
FIG. 8 is a flowchart of a method according to an example embodiment.

In FIG. 8, a flowchart shows a method according to an example embodiment. The method involves circulating 800 a liquid desiccant through an air-liquid interface. Air is caused to flow 801 across the air-liquid interface such that the liquid desiccant absorbs water from the air. The liquid desiccant is diluted via the absorption of the water to form an output stream. The output stream is split 802 into a diluted stream and a concentrated stream at an input to an electrodialytic stack. The electrodialytic stack has a central ionic exchange membrane and first and second outer ionic exchange membranes of a different type (e.g., cation or anion) than the central ionic exchange membrane.

The diluted stream is caused to flow 803 between the central ionic exchange membrane and the first outer ionic exchange membrane. The concentrated stream is caused to flow 804 between the central ionic exchange membrane and the second outer ionic exchange membrane. A redox shuttle loop is circulated 805 around the first and second outer ionic exchange membranes. A voltage is applied 806 across the electrodialytic stack to cause ionic movement across the central ionic exchange membrane and the first outer ionic exchange membrane. This movement results in a desiccant concentrate moving from the diluted stream to the redox shuttle loop and to the concentrated stream.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. An air conditioning system, comprising:
   an electrodialytic stack comprising:
      a pump-driven, liquid desiccant loop with a diluted stream and a concentrated stream of liquid desiccant separated by a central ionic exchange membrane;
      a redox shuttle loop flowing across first and second outer ionic exchange membranes of a different type than the central ionic exchange membrane, the redox shuttle loop separated from the diluted stream and the concentrated stream of the liquid desiccant loop by the first and second outer ionic exchange membranes; and
      electrodes that are operable to apply a voltage across the electrodialytic stack;
   an air-liquid interface in fluid communication with the concentrated stream, the concentrated stream being diluted via absorption of water from the air via the air-liquid interface to form an output stream of the liquid desiccant and a stream of dehumidified air, the output stream from the air-liquid interface being split into the diluted stream and the concentrated stream upon entry into the electrodialytic stack; and
   a sensible cooling element that receives and cools the dehumidified air.

2. The air conditioning system of claim 1, wherein the voltage causes:
   a first ionic movement across the central ionic exchange membrane and the first outer ionic exchange membrane resulting in a desiccant concentrate moving from the diluted stream to a first redox stream of the redox shuttle loop and to the concentrated stream; and
   a second ionic movement across the second outer exchange membrane that causes movement of the desiccant concentrate from a second redox stream of the redox shuttle loop to the concentrated stream.

3. The air conditioning system of claim 1, wherein the central ionic exchange membrane comprises a cation exchange membrane and wherein the first and second outer ionic exchange membranes comprise anion exchange membranes.

4. The air conditioning system of claim 2, wherein the desiccant concentrate comprises NaCl, LiCl, LiBr, CaCl$_2$), or combinations thereof.

5. The air conditioning system of claim 2, wherein the redox shuttle loop comprises $[\text{BTMAP-Fc}]^{2+}/[\text{BTMAP-Fc}]^{3+}$.

6. The air conditioning system of claim 1, wherein the central ionic exchange membrane comprises an anion exchange membrane and wherein the first and second outer ionic exchange membranes comprise cation exchange membranes.

7. The air conditioning system of claim 6, wherein a desiccant concentrate of the liquid desiccant loop comprises LiCl and wherein the redox shuttle loop comprises ferrocyanide/ferricyanide $[\text{Fe(CN)}_6]^{4-/3-}$ or a negatively charged ferrocene derivative.

8. The air conditioning system of claim 1, further comprising heat transfer elements in thermal communications with the air-liquid interface, the heat transfer elements carrying heat generated from the absorption of the water from the air into the output stream at the air-liquid interface to a heat sink.

9. The air conditioning system of claim 1, further comprising a reservoir that stores a portion of at least one of the diluted stream and the concentrated stream of the liquid desiccant, the stored portion being added to the liquid desiccant loop if the water absorbed from the air does not equal an amount of water added to the diluted stream.

10. The air conditioning system of claim 1, further comprising an electrodialytic battery in fluid communication with a reservoir storing a portion of fluid from the redox shuttle loop, the stored portion being used to generate electricity via the electrodialytic battery.

11. The air conditioning system of claim 2 further comprising:
a second redox shuttle loop with third and fourth redox streams separated from a second diluted stream and a second concentrated stream of the liquid desiccant loop by respective third and fourth outer ionic exchange membranes; and
a second central ionic exchange membrane between the third and fourth outer ionic exchange membranes, the voltage causing the second ionic movement across the second central ionic exchange membrane and a third ionic movement across the third outer ionic exchange membrane that causes desiccant concentrates from the second diluted stream to be moved to the third redox stream and to the second concentrated stream.

12. The air conditioning system of claim 11, wherein the diluted stream of the liquid desiccant loop is split into the second dilute stream and the second concentrated stream as it exits from membrane contact with the redox shuttle loop such that the second diluted stream flows between the second central ionic exchange membrane and the third outer ionic exchange membrane and the second concentrated stream flows between the second central ionic exchange membrane and the fourth outer ionic exchange membrane.

13. The air conditioning system of claim 12, wherein the second concentrated stream has approximately an equivalent desiccant concentrate level as the output stream and is remixed with the output stream.

14. A liquid desiccant system, comprising:
an electrodialytic stack comprising:
a liquid desiccant loop with a diluted stream and a concentrated stream of liquid desiccant separated by a central ionic exchange membrane;
a redox shuttle loop comprising a positively charged ferrocene derivative and with first and second redox streams separated from the diluted stream and the concentrated stream of the liquid desiccant loop by respective first and second outer ionic exchange membranes of a different type than the central ionic exchange membrane; and
first and second electrodes that are operable to apply a voltage across the electrodialytic stack; and
an air-liquid interface in fluid communication with the concentrated stream of the liquid desiccant, the air-liquid interface exposing the concentrated stream of the liquid desiccant to air flowing across the air-liquid interface, the concentrated stream being diluted via absorption of water from the air to form an output stream, the output stream being circulated back into the liquid desiccant loop of the electrodialytic stack.

15. The liquid desiccant system of claim 14, wherein the liquid desiccant comprises NaCl, LiCl, LiBr, $\text{CaCl}_2$), or combinations thereof.

16. The liquid desiccant system of claim 14, further comprising heat transfer elements in thermal communication with the air-liquid interface to remove heat from the liquid desiccant.

17. The liquid desiccant system of claim 14, further comprising a heat exchanger coupled to the air-liquid interface to remove heat generated by absorption of water in the liquid desiccant.

* * * * *